United States Patent [19]

Nagell

[11] Patent Number: 4,930,691
[45] Date of Patent: Jun. 5, 1990

[54] PNEUMATIC DOSIMETER

[75] Inventor: Bernt Nagell, Haugesund, Norway

[73] Assignee: Norsk Hydro a.s., Oslo, Norway

[21] Appl. No.: 255,269

[22] Filed: Oct. 11, 1988

[30] Foreign Application Priority Data

Oct. 9, 1987 [NO] Norway .................................. 874220

[51] Int. Cl.⁵ .......................... B65G 69/06; B05B 7/00
[52] U.S. Cl. .................... 222/630; 222/135;
222/195; 406/89; 406/119
[58] Field of Search ............... 222/195, 128, 630, 135;
406/89–91, 117–120, 136, 138

[56] References Cited

U.S. PATENT DOCUMENTS

| 3,188,144 | 6/1965 | Gmur et al. | 222/195 |
| 3,995,771 | 12/1976 | Olivier | 406/90 |
| 4,417,832 | 11/1983 | Krauss | 406/90 |
| 4,692,068 | 9/1987 | Harnotj et al. | 406/138 |

FOREIGN PATENT DOCUMENTS

| 182304 | 5/1986 | European Pat. Off. | 406/91 |
| 154401 | 9/1986 | Norway . | |

Primary Examiner—Michael S. Huppert
Assistant Examiner—Steven Reiss
Attorney, Agent, or Firm—Wenderoth, Lind & Ponack

[57] ABSTRACT

A pneumatic dosimeter for providing exact dosage of pulverulent materials, for instance for supplying aluminium oxide and fluoride to an aluminium electrolytic cell, comprises a vessel (1) with an upper chamber (2) which at the bottom is provided with a fluidizing device in the form of a fluidizing canvas (3) with an underlying chamber which is connected to an air source via a pipe line (5). The vessel is provided with an inlet (6) for the supply of pulverulent material from a supply tank or hopper (7) to the upper chamber (2), and an outlet opening for discharging the chamber (2). At least one fluidizing channel or pipe (9) is provided between the supply tank (7) and the vessel (1). This channel is provided with a fluidizing wall or fluidizing canvas (10) which is connected to an air supply source through a pipe line (12). The filling and emptying of the chamber (2) is carried out by solenoid valves (13,14) which are provided in the pipe line (5) connected to the vessel (1) and the pipe line (12) connected to the channel (9), respectively. The solenoid valves are controlled by a PLS governor or a processor such that air is supplied to the channel (9) and the vessel (1) according to a preferred time and frequency program.

22 Claims, 2 Drawing Sheets

PNEUMATIC DOSIMETER

BACKGROUND OF THE INVENTION

The present invention relates to a pneumatic dosimeter for the dosage of pulverulent materials, for instance for supplying aluminum fluoride and oxide to an aluminum electrolytic cell. The dosimeter comprises a vessel or container with an upper chamber wherein is provided a fluidizing canvas or air permeable dividing plate with an underlying chamber which is connected to an air filter via an air supply pipe. The vessel is provided with an inlet for the supply of pulverulent material from a hopper or supply tank to the upper chamber, and an outlet wherethrough the chamber is being emptied.

Devices which provide for the transport and dosage of pulverulent materials by utilizing generally known fluidizing principals are known in the art. Such devices necessarily utilize materials that are fluidizable; that is, they utilize pulverulent materials which have a grannular geometry and mutual cohesiveness that allow the individual granules of the material to be slowly separated and suspended when air or other gas is blown into the material. Suspension of the granules in the air or other gas allows the material to behave like a homogeneous liquid. Materials having such properties and characteristics include aluminum oxide which is used in fused salt electrolytic cells, cement, gypsum, calcium flouride, carbon powder, sodium sulphate, phosphates, polyphosphates, pryophosphtes, metal powder, powered plastic material, and food products such as flour, powdered milk, sugar and the like.

Norwegian patent application No. 855,219, which corresponds to U.S. Pat. No. 4,692,086, reveals an apparatus for providing doses of pulverulent materials and consists of a housing with a fluidizing device. The upper part of the housing is at one end connected to a vessel via a column and on the other end provided with an equilibrium and degassing column. The fluidizing device is provided at the bottom of a fluidizing wall with an underlying chamber which is connected to an air source via an air pipe. The dosage of the powder in the housing is accomplished by creating a state of equilibrium in each of the columns at the ends of the housing. The state at which equilibrium is reached is dependent on the air pressure and the powder consistency. Thus, only small differences in air pressure and/or differences in powder consistency will result in significant changes in the amount of material being dosed. The aparatus is also complicated and is physically large in height. The large height represents a major disadvantage, for instance, when being used in connection with electrolytic cells of the Soederberg type which require the use of dosimeters which are low in height.

Norwegian patent No. 154401 discloses a mechanical dosimeter for pulverulent material. The dosimeter consists of a vessel with walls converging towards an outlet opening in the bottom of the vessel. The powder is discharged through the hole in the bottom via a mechanical device which consists of a cylinder/piston arrangement. Though the mechanical dosimeter gives relatively exact doses, it is encumbered with several disadvantages. For one thing, the mechanical mechanisms become worn and thus require extensive maintenance. Further, the pulverulent material, depending upon its consistency, may clog the outlet opening of the hopper or vessel. This dosimeter is also expensive to produce due to the fact that it consists of several different parts, and that it is large in height.

SUMMARY OF THE INVENTION

It is an object of the present invention to provide a dosimeter which provides a volumetric dosage and utilizes the fluidizing principal, but which is not encumbered with the above-mentioned disadvantages. That is, the present invention should:

be low in height;
provide exact doses;
be devoid of mechanical closing devices in the material passageways of the dosimeter;
be less sensitive to changes in the air supply and changes in material quality; and
be simple and inexpensive to produce, have low maintenance costs (i.e. have no moveable mechanical parts), and be arranged to allow for easy electrical isolation electrically of electrical components.

According to the present invention, these objects are achieved by providing a dosimeter, for providing measured discrete doses of pulverulent material, which comprises: a vessel having an upper chamber with an inlet and an outlet; a channel connected at a first end to the inlet; a supply reservoir, connected to a second end of the channel, for supplying pulverulent material to the channel; a first fluidizing mechanism for fluidizing the pulverulent material in the channel and causing the material to flow into the upper chamber of the vessel until the upper chamber is substantially full with an amount of the pulverulent material which defines a predetermined dose; and a second fluidizing mechanism for fluidizing the predetermined dose of pulverulent material in the upper chamber after the first fluidizing mechanism ceases causing the material to flow into the upper chamber, and for causing substantially all of the predetermined dose of pulverulent material to flow out through the outlet of the upper chamber.

BRIEF DESCRIPTION OF THE DRAWING

The invention will now be further described by means of example and with reference to the drawings in which.

DETAILED DESCRIPTION OF THE INVENTION

Figure 1:
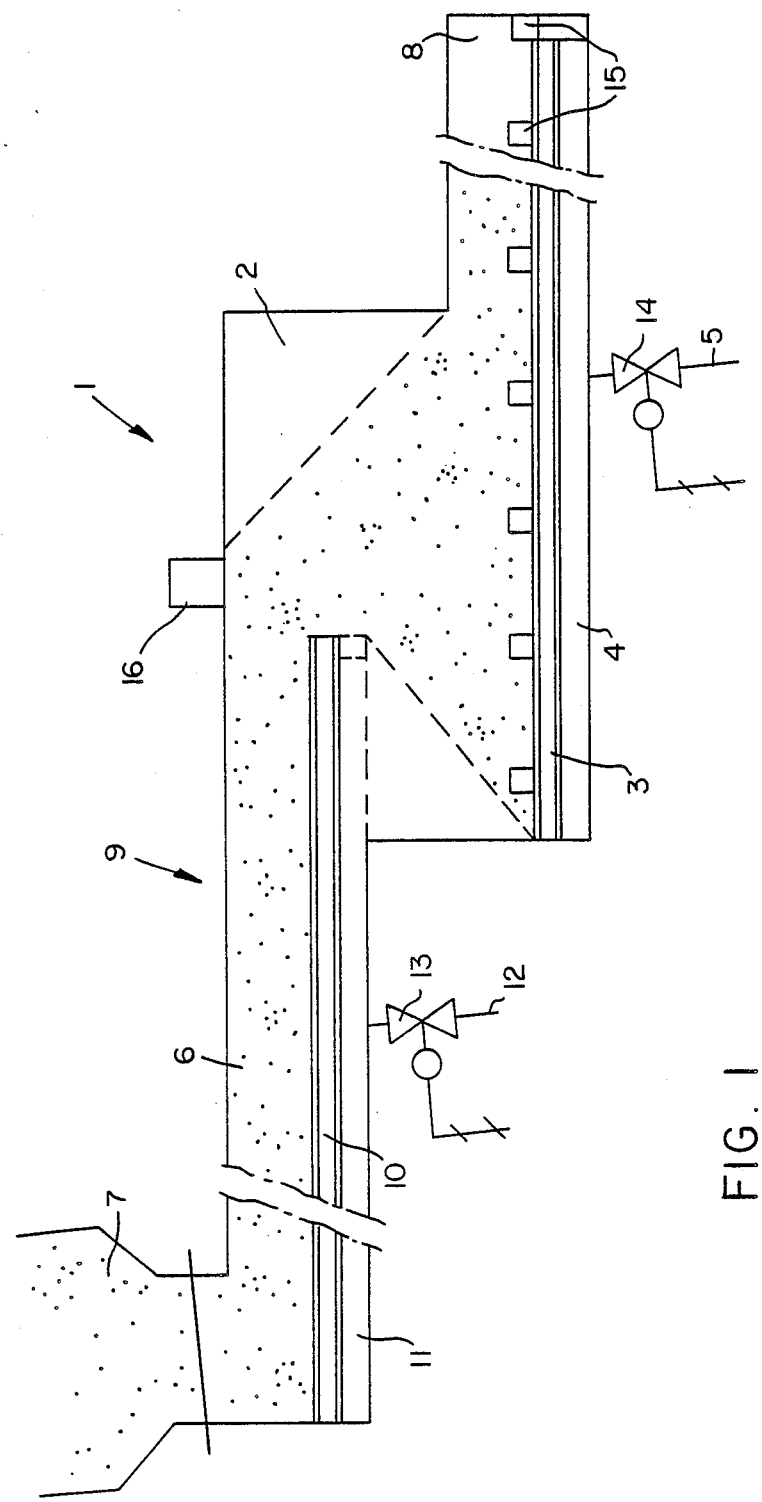
FIG. 1 shows a longitudinal section of the dosimeter according to the invention.

As can be seen from FIG. 1, the dosimeter consists of a vessel 1 with an upper chamber 2 which has a size corresponding to the amount of material to be dosed. A fluidizing wall in the form of canvas 3 or air/gas permeable material divides the upper chamber 2 from a lower chamber 4. The chamber 4 is connected to an air reservoir (not shown) via an air pipe 5. At one end of the vessel, on the right hand side of the drawing, is provided an outlet opening 8. On the opposite end of the vessel, at the upper part, there is provided a fluidizing channel or pipe 9 with an upper portion 6 through which pulverulent material is supplied. One end of the fluidizing channel 9 protrudes partly into the vessel 2, while the other end is connected to a supply vessel 7, or a supply pipe which is provided for supplying pulverulent material from a centrally arranged silo or storage bin. The upper part 6 of the channel 9 is divided from the lower part, a chamber 11, by means of a fluidizing wall or canvas 10. The chamber 11 is, in a similar way as the chamber 4, connected to an air reservoir (not shown) by means of a pipe 12.

The supply vessel opens into the channel through the top thereof adjacent a first end wall of the channel. The channel further has a second open end opposite the first end wall which forms a material inlet at a second end wall of the upper chamber.

When the pulverulent material is fluidizing, it will behave like a liquid, i.e. the influence of the gravitational force will make it flow from a higher to a lower level.

Due to these facts the fluidizing walls in the channel 9 and the vessel 1 are slightly inclined towards their respective outlet ends. The angle of inclination may be between 4° and 7°. However, the angle of inclination required is dependent upon the type of material to be handled and may, for some materials, be rather large and, for other materials, relatively small.

Though the drawing and the above text reveal that the fluidizing walls 3, 10 may be slightly inclined relative to the vessel and channel walls, it may instead be advantageous to arrange the fluidizing walls horizontal relative to the dosimeter and arrange the dosimeter itself at a slight incline.

The air supply to chambers 4 and 11 is governed by solenoid valves 13, 14 which are disposed in the pipes 5 and 12, respectively. The solenoid valves are governed directly by means of PLS-governor or computer (not shown). This arrangement is simpler than previous arrangements because it does not require extra relays or mechanical closing devices and their corresponding actuation devices.

The air supplied to the channel and vessel, is partly evacuated through an evacuation opening 16 loacted in the top wall of the chamber 2 and partly evacuated through the chamber outlet 8. The air evacuation opening 16 is particularly important in connection with the filling of the chamber 2, because as the air supplied to the channel is present behind the powder (the powder top in the chamber 2), the air will flow freely out through the evacuation opening 16 such that an excess pressure is not created behind the powder and the powder is not forced towards the outlet opening.

The dosimeter according to the invention operates as follows.

The air supplies 12, 5 to the channel 9 and the vessel 1 are initially closed. Pulverulent material which is present in the supply tank 7 flows down and partially fills the channel. Air is then supplied to the chamber 11 in the channel 9 as the solenoid valve 13 is activated. Thereby, the material is fluidized and flows into the chamber 2 in the vessel 1. When the chamber 2 is filled as shown in the drawing, the material flow will stop, even if the air supply to the channel is maintained.

After the chamber 2 is filled and the solenoid valve 13 is closed, the solenoid valve 14 is activated to supply air to the chamber 4 in the vessel 1. Now the material in chamber 2 is fluidized and discharged through outlet 8. As soon as the chamber 2 is emptied, the solenoid valve 14 is closed and the air supply to the chamber 2 is stopped. The filling/emptying cycle is now completed and a new cycle may start.

The amount of time required for filling and emptying the dosimeter is dependent upon several different factors such as the size of the chamber 2, the length and the width of the channel 9, the quality of the pulverulent material and so forth. It is, therefore, important that the air supply to the channel continues long enough so that the chamber 2 is completely filled up, and that the air supply to the vessel continues long enough so that the chamber 2 is emptied. The length of time the air supply continues beyond that which is necessary, seems to have little influence on the amount of material being discharged.

Figure 2:
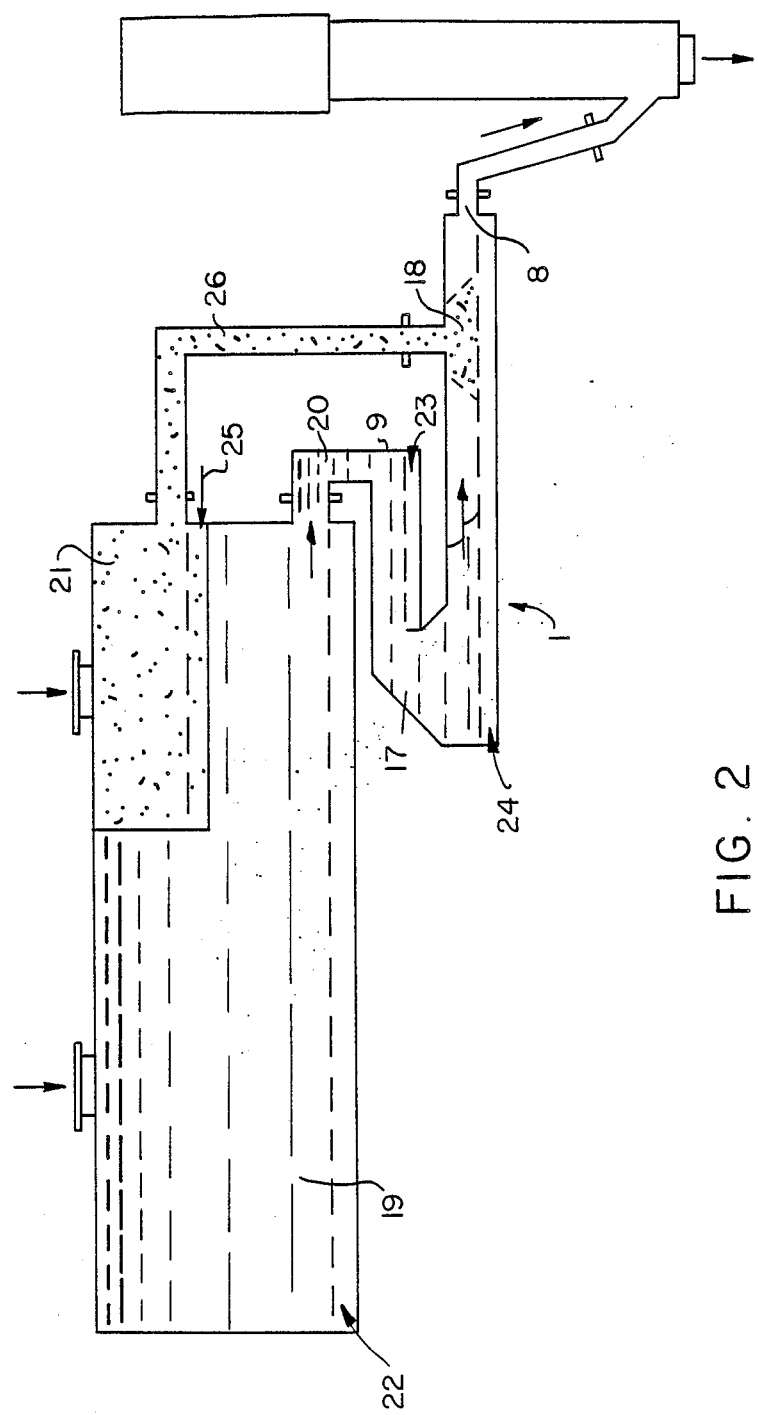
FIG. 2 shows another example of a dosimeter according to the invention.

FIG. 2 shows another embodiment of a dosimeter according to the invention. Instead of one inlet opening, the vessel 1 is provided with two inlet openings 17, 18. Thus, pulverulent material of one quality is supplied from a first supply tank 19 through a pipe line 20 and into the fluidizing channel or pipe 9, and pulverulent material of another quality is supplied from a second tank 21 directly into the vessel 1. The supply tank 21 in this case functions as both a magazine for pulverulent material and a fluidizing channel (corresponding to the fluidizing channel 9).

The dosimeter according to this example functions as follows:

Pulverulent material is fed from the supply tank 19 to the vessel 1 by supplying air to the tank 19 and channel 9 through air supply pipes 22 and 23, respectively (solenoid valves not shown).

As soon as the vessel 1 is full, the air supply through the pipes 22 and 23 is stopped and a solenoid valve (not shown) opens to allow air flow through pipe 24. The pulverulent material in the vessel 1 will now flow out through the outlet opening 8. When the vessel 1 is empty, the air supply through the pipe 24 is stopped, and a single dose of material has been supplied from the tank 19. When pulverulent material is to be discharged from the second tank 21, fluidized air is supplied to the tank through the air supply pipe 25, and the material will flow through the connection pipe 26 and partly fill up the vessel 1. Eventually no more material will flow into the vessel 1 and the air supply through the pipe 25 can be stopped. To empty the vessel 1, air is supplied to the vessel by opening the air supply through the pipe 24.

The air supply (through the solenoid valves) and the rate of dosage may be governed by means of a suitable PLS-governor or micro processor which will not be further described here. It should, however, be noted that the dosimeter according to the invention can be provided with more than one or two inlet openings as mentioned above. Thus, material may be supplied from three or more supply tanks in a similar manner as described above.

Example.

A dosimeter according to the invention as shown in FIG. 1 was tested using aluminum oxide of different qualities as pulverulent material. The dosage chamber 2 had a volume of approximately 0.5 dm$^3$, and the filling and emptying time for the chamber was 4 and 6 seconds, respectively. The doses for the different oxide qualities were measured versus different air pressures. The results of the tests are revealed in the table below.

| FLUIDIZING AIR PRESSURE mm water height | 2500 | 3750 | 5000 | DENSITY |
|---|---|---|---|---|
| Re. C. OXIDE | 430 | 440 | 450 | 1.04 |
| Re. C. OXIDE II | 445 | 445 | 450 | 1.08 |
| Primary OXIDE | 475 | 490 | 500 | 1.24 |
| Primary OXIDE II | 450 | 465 | 470 | 1.06 |

(Re. C. OXIDE: Recirculated oxide)

As will be apparent from the table, the amount of material (doses) varies very little with the increase in air pressure, even if the pressure is doubled. This was true for each of the four different qualities of pulverulent material being tested.

The dosimeter according to the invention may be made of different types of material, such as steel, aluminum, plastics materials, etc. It is, however, important that the material is sufficiently resistant when being exposed to damaging enviroments such as heat or corrosive gasses.

It should be added that it is possible to provide a transverse threshold or elevation 15 above the canvas at the outlet opening 8, and also to provide one or more additional thresholds spaced along the canvas on the inside of the opening (FIG. 1), such that some part of the pulverulent material is left behind to cover and protect the canvas.

I claim

1. A dosimeter for providing measured discrete doses of pulverulent material, comprising:
   a vessel having an upper chamber with an inlet and an outlet;
   a channel connected at a first end to said inlet;
   supply means, connected to a second end of said channel, for supplying pulverulent material to said channel;
   first fluidizing means for fluidizing the pulverulent material in said channel and causing the pulverulent material to flow into said upper chamber of said vessel until said upper chamber is substantially full with an amount of said pulverulent material which defines a predetermined dose and terminates pulverulent material flow into said upper chamber after said predetermined dose has been accumulated; and
   second fluidizing means for fluidizing said predetermined dose of pulverulent material in said upper chamber after said first fluidizing means ceases causing said pulverulent material to flow into said upper chamber, and for causing substantially all of said pulverulent material in said upper chamber to flow out through said outlet of said upper chamber to dispense said predetermined dose while no pulverulent material is flowing from said channel into said chamber.

2. A dosimeter as recited in claim 1, wherein
   said second fluidizing means comprises:
   a lower chamber of said vessel;
   gas supply means for supplying pressurized gas to said lower chamber of said vessel; and
   divider means for dividing said upper and lower chambers, preventing said pulverulent material from entering said lower chamber and allowing said gas to pass from said lower chamber into said upper chamber.

3. A dosimeter as recited in claim 2, wherein
   said channel includes an upper section through which said pulverulent material flows; and
   said first fluidizing means comprises:
   a lower section of said channel;
   further gas supply means for supplying pressurized gas to said lower section of said channel; and
   further divider means for dividing said upper and lower sections, preventing said pulverulent material from entering said lower section and allowing gas to pass from said lower section into said upper section.

4. A dosimeter as recited in claim 3, wherein
   said further divider means comprises a gas permeable membrane.

5. A dosimeter as recited in claim 3, wherein
   said further gas supply means is controllable independently of said gas supply means.

6. A dosimeter as recited in claim 3, further comprising
   pressure relief means for allowing gas to escape from said upper chamber of said vessel.

7. A dosimeter as recited in claim 3, wherein
   said lower chamber of said vessel extends as a continuous chamber beneath the entire length of said upper chamber.

8. A dosimeter as recited in claim 2, wherein
   said lower chamber of said vessel extends as a continuous chamber beneath the entire length of said upper chamber.

9. A dosimeter as recited in claim 1, further comprising
   secondary supply means, fluidically connected with said upper chamber, for supplying secondary pulverulent material to said upper chamber.

10. A dosimeter as recited in claim 9, further comprising
    third fluidizing means for fluidizing the secondary pulverulent material in said secondary supply means and causing it to flow into said upper chamber.

11. A dosimeter as recited in claim 1, wherein
    said divider means comprises a gas permeable membrane.

12. A dosimeter for providing measured discrete doses of pulverulent material, comprising:
    a vessel having an upper chamber with an inlet and an outlet;
    a channel connected at a first end to said inlet;
    supply means, connected to a second end of said channel, for supplying pulverulent material to said channel;
    feed means for feeding said pulverulent material from said channel, through said inlet and into said upper chamber until such time as said pulverulent material backs up in said upper chamber to block said inlet with an amount of said pulverulent material which defines a predetermined dose; and
    discharge means for discharging substantially all of said pulverulent matrerial through said outlet to dispense said predetermined dose.

13. A dosimeter as recited in claim 12, wherein said feed means comprises a first fluidizing means for fluidizing said pulverulent material in said channel; and
    said discharge means comprises a second fluidizing means for fluidizing said predetermined dose of said pulverulent material in said upper chamber.

14. A dosimeter as recited in claim 13, wherein
    said second fluidizing means comprises:
    gas supply means for supplying pressurized gas to said lower chamber of said vessel; and
    divider means for dividing said upper and lower chambers, preventing said pulverulent material from entering said lower chamber and allowing said gas to pass from said lower chamber into said upper chamber.

15. A dosimeter as recited in claim 14, wherein
    said first fluidizing means comprises:
    a lower section of said channel;

further gas supply means for supplying pressurized gas to said lower section of said channel; and further divider means for dividing said upper and lower sections, preventing said pulverulent material from entering said lower section and allowing said gas to pass from said lower section into said upper section.

16. A dosimeter as recited in claim 15, further comprising:

threshold means, transversely mounted across said divider means, for retaining a small amount of said pulverulent material in said upper chamber to cover and protect said divider means.

17. A dosimeter as recited in claim 16, wherein said threshold means comprises a first threshold transversely mounted across said divider means at said outlet of said upper chamber.

18. A dosimeter s recited in claim 17, wherein said threshold means further comprises at least one additional threshold transversely mounted across said divider means in longitudinaly spaced relation to said first threshold.

19. A dosimeter as recited in claim 15, wherein pressure relief means for allowing gas to escape from said upper chamber of said vessel.

20. A dosimeter for providing measured discrete doses of pulverulent material, comprising:

a vessel having a top wall, a bottom wall, a first end wall, and a second end wall opposite said first end wall;

an outlet port formed in said first end wall of said vessel, and an inlet port formed in said second end wall of said vessel adjacent said top wall of said vessel;

a channel member having a top wall, a bottom wall, a first end wall, and an open second end opposite said first end wall, said channel having an inlet opening formed in its top wall adjacent its first end wall, said open second end of said channel being connected with said inlet port of said vessel;

supply means, connected with said inlet opening of said channel, for supplying pulverulent material to said channel;

furst fluidizing means for fluidizing the pulverulent material in said channel and causing it to flow into said vessel; and second fluidizing means for fluidizing the pulverulent material in said vessel and causing it to flow out through said outlet port of said vessel.

21. A dosimeter as recited in claim 20, wherein said first fluidizing means comprises:

a first fluidizing chamber defined in a lower portion of said channel;

a gas permeable membrane extending between said first end wall and said open second end of said channel and dividing said first fluidizing chamber from an upper portion of said channel; and a first gas supply means for supplying pressurized gas into said first fluidizing chamber.

22. A dosimeter as recited in claim 21, wherein said second fluidizing means comprises:

a second fluidizing chamber defined in a lower portion of said vessel;

a gas permeable membrane extending between said first and second end walls of said vessel and dividing said second fluidizing chamber from an upper portion of said vessel; and a second gas supply means for supplying pressurized gas into said second fluidizing chamber.

* * * * *